United States Patent
Brilliant et al.

(10) Patent No.: US 12,123,401 B2
(45) Date of Patent: *Oct. 22, 2024

(54) WIND TURBINE LIGHTNING PROTECTION SYSTEM

(71) Applicant: Vestas Wind Systems A/S, Aarhus N (DK)

(72) Inventors: Nathan A. Brilliant, Arvada, CO (US); Lasse Lykkegaard, Herning (DK); Angela Thwaites, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/006,915

(22) PCT Filed: Jul. 26, 2021

(86) PCT No.: PCT/DK2021/050248
§ 371 (c)(1),
(2) Date: Jan. 26, 2023

(87) PCT Pub. No.: WO2022/022790
PCT Pub. Date: Feb. 3, 2022

(65) Prior Publication Data
US 2023/0272780 A1    Aug. 31, 2023

Related U.S. Application Data

(60) Provisional application No. 63/056,778, filed on Jul. 27, 2020.

(30) Foreign Application Priority Data

Aug. 11, 2020  (DK) .............................. PA 202070523

(51) Int. Cl.
*F03D 80/30*   (2016.01)
*F03D 1/06*   (2006.01)

(52) U.S. Cl.
CPC ........... *F03D 80/30* (2016.05); *F03D 1/0675* (2013.01); *F03D 1/0684* (2023.08)

(58) Field of Classification Search
CPC ...... F03D 80/30; F03D 80/301; F03D 1/0684; F03D 1/0679; F03D 1/0675
See application file for complete search history.

(56) References Cited

U.S. PATENT DOCUMENTS 8,449,259 B1 * 5/2013 Kaser ...................... F03D 80/30
416/146 R
8,517,681 B2 * 8/2013 Naka ...................... F03D 80/30
416/1

(Continued)

FOREIGN PATENT DOCUMENTS

CN       202431453 U  *  9/2012
CN       104564528 A     4/2015

(Continued)

OTHER PUBLICATIONS

International Searching Authority, International Search Report and Written Opinion issued in corresponding PCT Application No. PCT/DK2021/050248 dated Oct. 18, 2021.

(Continued)

*Primary Examiner* — Justin D Seabe
(74) *Attorney, Agent, or Firm* — Wood Herron & Evans LLP

(57) ABSTRACT

A wind turbine blade comprising a lightning protection system, which is at least partly disposed in an inboard portion of the blade. The lightning protection system comprises a down conductor cable portion and a supporting component to hold the cable portion in free space in a position near or on a camber line of the blade aerofoil section, so that the cable portion is spaced apart from at least one electrically conductive structural component. The lightning protection system may comprise a plurality of inboard (Continued)

down conductor cables and a diverging electrical junction; and/or a down conductor cable having root and tip portions having insulation with different electrical breakdown voltages.

19 Claims, 16 Drawing Sheets

(56) References Cited

U.S. PATENT DOCUMENTS

| | | | | |
|---|---|---|---|---|
| 9,797,381 | B2* | 10/2017 | Iriarte Eleta | F03D 80/40 |
| 10,125,744 | B2* | 11/2018 | March Nomen | F03D 80/30 |
| 10,519,927 | B2* | 12/2019 | Tobin | B29D 99/0028 |
| 2016/0131110 | A1 | 5/2016 | Livingston et al. | |
| 2016/0177926 | A1 | 6/2016 | Akhtar et al. | |
| 2022/0042493 | A1* | 2/2022 | Nielsen | F03D 80/30 |

FOREIGN PATENT DOCUMENTS

| | | |
|---|---|---|
| CN | 110219784 A | 9/2019 |
| EP | 2282057 A1 | 2/2011 |
| EP | 2458207 A2 | 5/2012 |
| EP | 3004638 A1 | 4/2016 |
| EP | 3091228 A1 | 11/2016 |
| EP | 3255275 A1 | 12/2017 |
| EP | 3597911 A1 | 1/2020 |
| WO | 2011080177 A1 | 7/2011 |
| WO | 2014187895 A1 | 11/2014 |
| WO | 2020104471 A1 | 5/2020 |

OTHER PUBLICATIONS

Danish Patent and Trademark Office, Examination Report issued in corresponding Danish Application No. PA 2020 70523, dated May 6, 2021.

* cited by examiner

WIND TURBINE LIGHTNING PROTECTION SYSTEM

FIELD OF THE INVENTION

The present invention is in the field of wind turbines, specifically wind turbine lightning protection systems.

BACKGROUND OF THE INVENTION

Wind turbines can be struck by lightning. The electric current within a typical negative cloud to ground lightning discharge rises very quickly to its peak value in 1-10 microseconds, then decays more slowly over 50-200 microseconds. This electric current, when striking the blade of a wind turbine, travels to ground via the lowest impedance path. Without any lightning protection, this path generally includes electrically conductive components of the wind turbine. A large electric current through such a component has the potential to cause damage to the component. In order to protect components of the wind turbine, lightning protection systems have been developed. A wind turbine blade having one such lightning protection system is shown in FIG. 3.

SUMMARY OF THE INVENTION

It has been identified that known lightning protection systems can be improved by the following aspects of the invention, in which electricity passing from a tip of the blade passes through the lightning protection system. In the following aspects of the invention, the likelihood of electricity passing through other electrically conductive components of the blade, such as electrically conductive structural components, is significantly reduced.

There may be an electrically conductive component of the blade, such as a spar cap comprising carbon fibres. There may be a potential difference between the electrically conductive component and one or more down conductors of the blade extending in proximity to the structural component. In the event of a lightning strike causing an electrical current in the down conductor it may be desirable to avoid electricity passing through the electrically conductive component. It may be desirable to avoid a current or attachment to the electrically conductive component as the current may not flow in a reliable or predictable path through the component, and it can be difficult to model and predict the effects of likely current paths through the electrically conductive component.

A first aspect of the invention provides a wind turbine blade comprising:
 a root end and a tip end, a spanwise dimension extending between the root and tip ends; and an inboard portion extending up to 50% of the spanwise dimension from the root end towards a midpoint between the root and tip ends;
 at least one electrically conductive component disposed in the inboard portion; and
 a lightning protection system comprising:
  a down conductor cable portion, disposed inside the inboard portion of the blade; and
  a supporting component,
 wherein the down conductor cable portion is secured in free space by the supporting component in a position near or on the camber line of the blade aerofoil section, spaced away from the at least one electrically conductive component.

The first aspect of the invention has the advantage of permitting the distance between the lightning protection system and any other electrically conductive component of the blade to be maximised, reducing the likelihood of interaction between the lightning protection system and any other electrically conductive component of the blade.

The expression "an inboard portion extending up to 50% of the spanwise dimension from the root end towards a midpoint between the root and tip ends" means that the inboard portion starts at the root end and extends to a point on the blade no further than 50% of the spanwise dimension from the root. In other words, the inboard portion is only in the first half of the blade length as measured from the root. Expressed another way, the inboard portion has a proximal end at the blade root and a distal end, the distal end being positioned no further than 50% of the spanwise dimension from the root.

The down conductor cable portion may be located as far away as possible from any or each electrically conductive component of the blade.

The at least one electrically conductive component may comprise a structural component. The at least one electrically conductive component may comprise a spar cap. The spar cap may comprise carbon fibres. The carbon fibres may be pultruded carbon fibres.

The blade may comprise two shell halves. Each shell half may have an electrically conductive component. The down conductor cable portion may be spaced substantially equally from both electrically conductive components.

The blade may comprise at least one shear web. The down conductor cable portion may be secured in free space by the supporting component, spaced away from the at least one shear web.

The supporting component may be attached to the at least one shear web.

The supporting component may be attached to the at least one shear web at at least two locations on the shear web. The blade may comprise at least two shear webs. The supporting component may be attached to more than one of the at least two shear webs. The down conductor cable portion may be disposed substantially centrally between a pair of the at least two shear webs.

The supporting component may be one or more of: a foam piece; a foam sack; a bracket, optionally an X-shaped bracket, a C-shaped bracket, a Y-shaped bracket; or a straight beam.

The down conductor cable portion may at least partly overlap with the electrically conductive component in a spanwise direction.

A second aspect of the invention provides a wind turbine blade comprising:
 a root end and a tip end, a spanwise dimension extending between the root and tip ends; and an inboard portion extending up to 50% of the spanwise dimension from the root end towards a midpoint between the root and tip ends;
 at least one electrically conductive component disposed at least partly in the inboard portion; and
 a lightning protection system comprising:
  a down conductor;
  a diverging electrical junction disposed in the inboard portion; and
  a plurality of inboard down conductor cables arranged electrically in parallel to one another, disposed in the inboard portion;
  wherein the lightning protection system is configured so as to conduct electricity through the down conductor, through the diverging electrical junction, through the plurality of inboard down conductor cables, towards the root end of the blade.

The second aspect of the invention has the advantage of reducing the potential difference between the lightning protection system and any other electrically conductive component of the blade. The plurality of inboard down conductor cables are disposed between the diverging electrical junction and the root end. Specifically, the plurality of inboard down conductor cables being arranged electrically in parallel to one another reduces the current passing through each individual down conductor cable, and the potential difference between each individual down conductor cable and any other electrically conductive component of the blade is reduced. This is particularly advantageous in the inboard portion of the blade as the potential difference increases along the lightning protection system from the tip end towards the root end of the blade during a lightning strike.

The plurality of inboard down conductor cables may be spaced apart from one another. The plurality of inboard down conductor cables may be spaced apart from one another away from the diverging electrical junction.

The plurality of inboard down conductor cables may comprise at least one down conductor cable on or proximate the blade neutral axis.

The plurality of inboard down conductor cables may comprise at least one inboard down conductor cable substantially disposed between a leading edge and a shear web of the blade. Alternatively or in addition, the plurality of inboard down conductor cables may comprise at least one inboard down conductor cable substantially disposed between a trailing edge and a shear web of the blade. Alternatively or in addition, the plurality of inboard down conductor cables may comprise at least one inboard down conductor cable substantially disposed at or proximate to the leading edge of the blade.

The plurality of inboard down conductor cables may comprise at least one inboard down conductor cable attached to an interior surface of an outer shell of the blade.

At least one of the inboard down conductor cables may be arranged in an at least partly meandering configuration. Alternatively or in addition, at least one of the inboard down conductor cables may be arranged so as to be substantially straight.

The plurality of inboard down conductor cables may comprise at least one inboard down conductor cable substantially disposed at or proximate a shear web of the blade.

At least one of the plurality of inboard down conductor cables may pass through an aperture in a shear web of the blade.

The plurality of inboard down conductor cables may comprise at least three down conductor cables.

The inboard portion may extend up to 40% of the spanwise dimension from the root end towards the tip end; preferably up to 30% of the spanwise dimension from the root end towards the tip end.

At least part of the down conductor may comprise an electrically conductive metal foil on an outer surface of the blade. The metal foil may comprise aluminium. At least one of the plurality of inboard down conductor cables may be arranged electrically in series with the metal foil.

The metal foil may form the diverging electrical junction and the plurality of inboard down conductor cables extend from the metal foil towards the root end.

The down conductor may comprise a down conductor cable and the diverging electrical junction may split the down conductor cable into the plurality of inboard down conductor cables.

The lightning protection system may comprise a converging electrical junction disposed in the inboard portion. The converging electrical junction may be electrically connected to the plurality of inboard down conductor cables. The converging electrical junction may be disposed closer to the root end of the blade than the plurality of inboard down conductor cables.

The converging electrical junction may be disposed closer to a root end of the blade than the electrically conductive component. The converging electrical junction may be spaced apart from the electrically conductive component.

The diverging electrical junction may be arranged such that the plurality of inboard down conductor cables at least partly overlap with the electrically conductive component.

The spanwise dimension may have an outboard portion extending up to 50% of the spanwise dimension from the tip end to a midpoint between the root and tip ends. The lightning protection system may comprise an outboard down conductor disposed in the outboard portion of the blade.

The outboard down conductor may be an outboard down conductor cable.

The at least one electrically conductive component may be a structural component. The at least one electrically conductive component may comprise a spar cap. The spar cap may comprise carbon fibres. The carbon fibres may be pultruded carbon fibres.

A third aspect of the invention provides a wind turbine blade comprising:
  a root end and a tip end, a spanwise dimension extending between the root and tip ends; and an inboard portion extending up to 50% of the spanwise dimension from the root end towards a midpoint between the root and tip ends;
  a lightning protection system comprising a down conductor cable at least partly disposed inside the inboard portion of the blade,
  wherein the down conductor cable comprises a cable first portion and a cable second portion, the cable first portion being closer to the root end of the blade than the cable second portion, each cable portion comprises insulation which has a respective electrical breakdown voltage, wherein the cable first portion insulation electrical breakdown voltage is higher than the cable second portion insulation electrical breakdown voltage. The insulation may comprise or consist of a dielectric material.

The third aspect of the invention has the advantage of reducing the potential difference between the lightning protection system and any other electrically conductive component of the blade. Specifically, by providing a down conductor cable first portion having a higher insulation electrical breakdown voltage, in the inboard portion of the blade, closer to the root end than the second portion, any interaction between the lightning protection system and any conductive components in the blade are minimised.

Expressed another way, the insulation of the cable first portion has a first dielectric strength value and the insulation of the cable second portion has a second dielectric strength value. The first dielectric strength value is higher than the second dielectric strength value.

The cable first portion may comprise insulation which has an electrical breakdown voltage at least 1.2 times higher than the electrical breakdown voltage of the cable second portion insulation, preferably at least 1.5 higher, and more preferably at least 1.6 times higher.

As an example, the cable first portion may be the cable PT6-CU50 HV500DC and the cable second portion may be the cable PT6-CU50 HV300DC (both cables from PolyTech NS, Denmark).

The difference in electrical breakdown voltage of the insulation of the cable first portion and the cable second portion may arise from one or more of: thickness; material; or shape.

The spanwise dimension may have an outboard portion extending up to 50% of the spanwise dimension from the tip end to a midpoint between the root and tip ends. The lightning protection system may comprise an outboard down conductor disposed in the outboard portion of the blade. The outboard down conductor may comprise insulation which has an electrical breakdown voltage higher than the insulation of the cable second portion, and optionally a higher electrical breakdown voltage than the insulation of the cable first portion.

The outboard down conductor may comprise insulation which has a higher electrical breakdown voltage than the cable second portion insulation electrical breakdown voltage.

The wind turbine blade may further comprise an electrically conductive metal foil on an outer surface of the blade, wherein the down conductor cable is either:
  arranged electrically in parallel with the metal foil; or
  arranged electrically in series with the metal foil.

The, or at least one of the, down conductor cables may be spaced apart from at least one electrically conductive component of the blade.

The cable first portion may overlap at least partly with the at least one electrically conductive component of the blade. This overlap may be in a spanwise direction of the blade.

The at least one electrically conductive component may comprise a structural component. The at least one electrically conductive component may comprise a spar cap. The spar cap may comprise carbon fibres. The carbon fibres may be pultruded carbon fibres.

The cable second portion of the second aspect of the invention may be at least partly comprised in the plurality of inboard down conductor cables of the first aspect of the invention. The plurality of inboard down conductor cables may each have insulation having a different electrical breakdown voltage to one another. At least one of the down conductor cables may have insulation having the same electrical breakdown voltage as the cable first portion insulation.

The inboard portion may extend up to 40% of the spanwise dimension from the root end towards the tip end; preferably up to 30% of the spanwise dimension from the root end towards the tip end.

The or each cable may comprise a sheath. The or each cable's respective insulation having an electrical breakdown voltage may be provided by the sheath.

Features of the first, second and third aspects of the invention may be combined with each other. In particular, the down conductor cable portion of the first aspect of the invention may be at least a portion of any of the plurality of inboard down conductor cables of the second aspect of the invention.

The wind turbine blade of the third aspect of the invention may have the features of the first aspect of the invention. The down conductor cable portion of the first aspect of the invention may be at least one of the plurality of inboard down conductor cables of the second aspect of the invention.

At least one of the inboard down conductor cables may be spaced apart from an electrically conductive portion of one or more of: a sensor system; a de-icing system; an anti-icing system, a lighting system; a load control system, or any other wired system.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
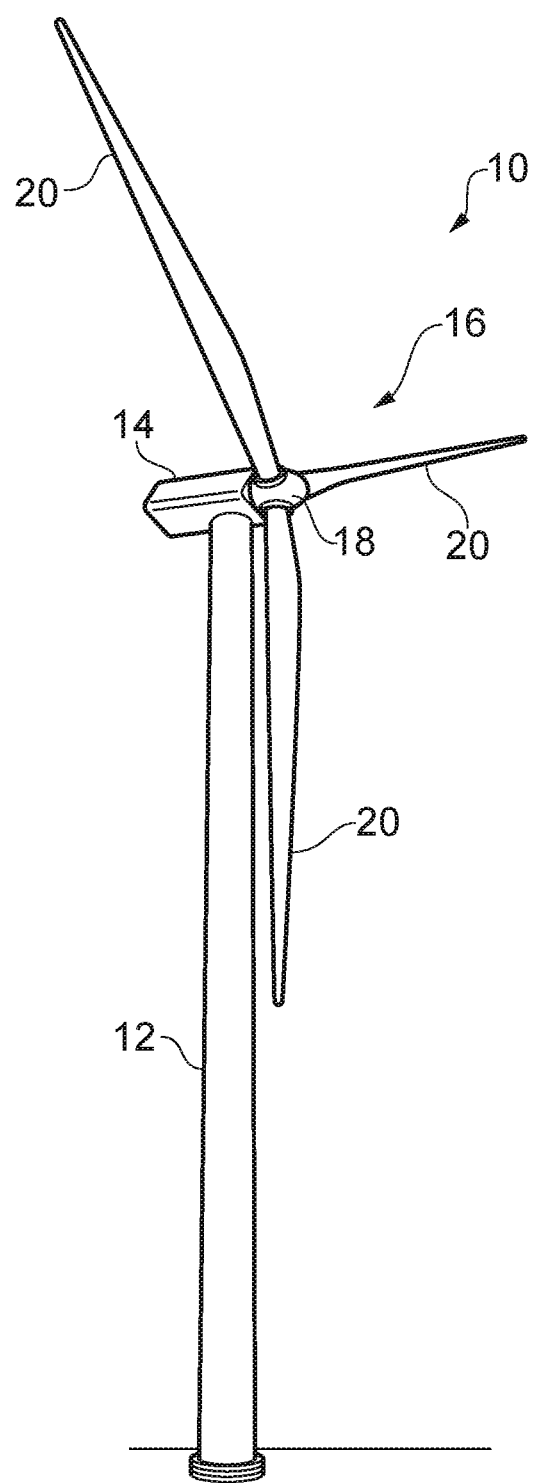
FIG. 1 shows a wind turbine.

In this specification, terms such as root end, tip end, inboard, outboard, spanwise, leading edge, trailing edge, spar cap, shear web, outer shell, and camber line, are used. While these terms are well known and understood to a person skilled in the art, definitions are given below for the avoidance of doubt.

The term "root" used herein in relation to a blade end, refers to an end of the blade at which the blade is attached to a hub 20 of a turbine 1. The term "tip" used herein in relation to a blade end, refers to a blade end that is radially furthest away from the axis of rotation 2 of the hub 20.

The term "spanwise" is used to refer to refer to a dimension or direction from a root end of a wind turbine blade to a tip end of the blade, or vice versa. When a wind turbine blade is mounted on a wind turbine hub, the spanwise and radial directions of the wind turbine blade will be substantially the same.

The term "inboard" is used to refer to a portion of the blade closer to the root end than the tip end in the spanwise direction. The term "outboard" is used to refer to a portion of the blade closer to the tip end than the root end in the spanwise direction.

The term "leading edge" is used to refer to an edge of the blade which will be at the front of the blade as the blade rotates in the normal rotation direction of the wind turbine rotor.

The term "trailing edge" is used to refer to an edge of a wind turbine blade which will be at the back of the blade as the blade rotates in the normal rotation direction of the wind turbine rotor.

The chord of a blade is the straight line distance from the leading edge to the trailing edge in a given cross section perpendicular to the blade spanwise direction.

A pressure surface (or windward surface) of a wind turbine blade is a surface between the leading edge and the trailing edge, which, when in use, has a higher pressure than a suction surface of the blade.

A suction surface (or leeward surface) of a wind turbine blade is a surface between the leading edge and the trailing edge, which will have a lower pressure acting upon it than that of a pressure surface, when in use.

The thickness of a wind turbine blade is measured perpendicularly to the chord of the blade and is the greatest distance between the pressure surface and the suction surface in a given cross section perpendicular to the blade spanwise direction.

The term "spar cap" is used to refer to a longitudinal, generally spanwise extending, reinforcing member of the blade. The spar cap may be embedded in the blade shell, or may be attached to the blade shell. The spar caps of the windward and leeward sides of the blade may be joined by one or more shear webs extending through the interior hollow space of the blade. The blade may have more than one spar cap on each of the windward and leeward sides of the blade. The spar cap may form part of a longitudinal reinforcing spar or support member of the blade. In particular, a first and a second spar cap may form part of the load bearing structure extending in the longitudinal direction that carries the flap-wise bending loads of the blade.

The term "shear web" is used to refer to refer to a longitudinal, generally spanwise extending, reinforcing member of the blade that can transfer load from one of the windward and leeward sides of the blade to the other of the windward and leeward sides of the blade.

The term "shell" is used to refer to an outer aerodynamic structure of the blade. The shell may be provided as two shell halves, which may be bonded together by an adhesive.

The term "camber line" is used to refer to a line upon which a profile thickness distribution is symmetrically superimposed. In a typical wind turbine blade the camber line will be curved.

The term "breakdown voltage" is the voltage which causes a severe loss of the insulating properties of the cable's insulation FIG. 1 shows a wind turbine 10 including a tower 12 and a nacelle 14 disposed at the apex of the tower 12.

A rotor 16 is operatively coupled via a gearbox to a generator (not shown) housed inside the nacelle 14. The rotor 16 includes a central hub 18 and a plurality of rotor blades 20, which project outwardly from the central hub 18. While the embodiment shown in FIG. 1 has 3 blades, it will be understood by the skilled person that other numbers of blades are possible.

When wind blows against the wind turbine 10, the blades 20 generate a lift force which causes the rotor 16 to rotate, which in turn causes the generator within the nacelle 14 to generate electrical energy.

Figure 2:
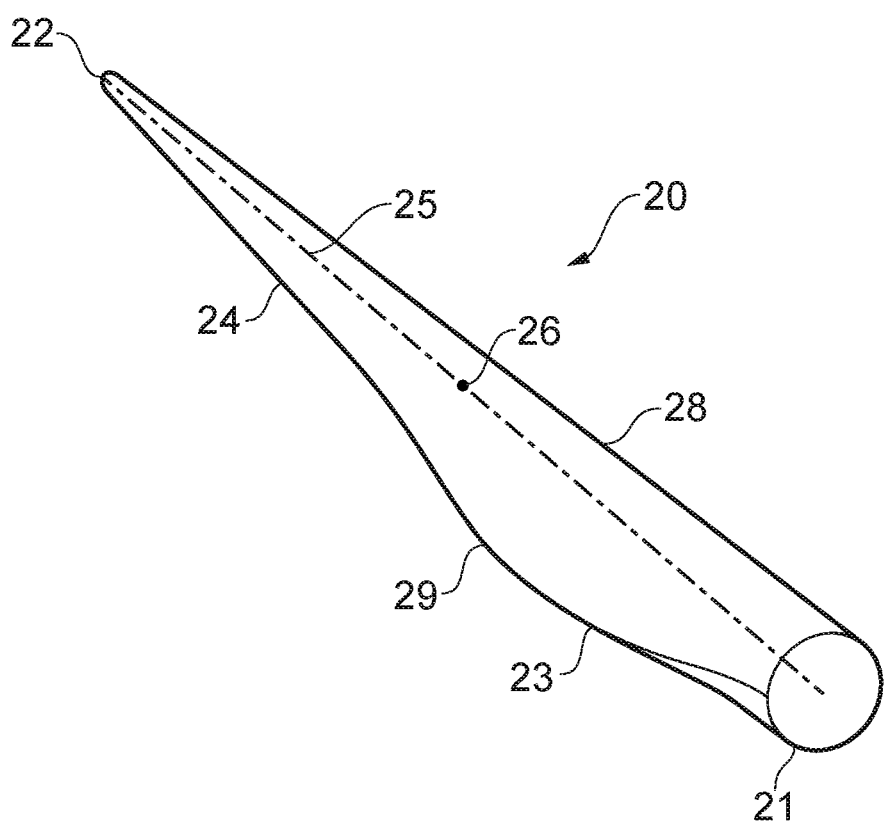
FIG. 2 shows a wind turbine blade.

FIG. 2 illustrates a wind turbine blade 20 for use in such a wind turbine 10. The wind turbine blade 20 has a root end 21 and a tip end 22. The wind turbine blade 20 has a leading edge 28 and a trailing edge 29.

Figure 3:
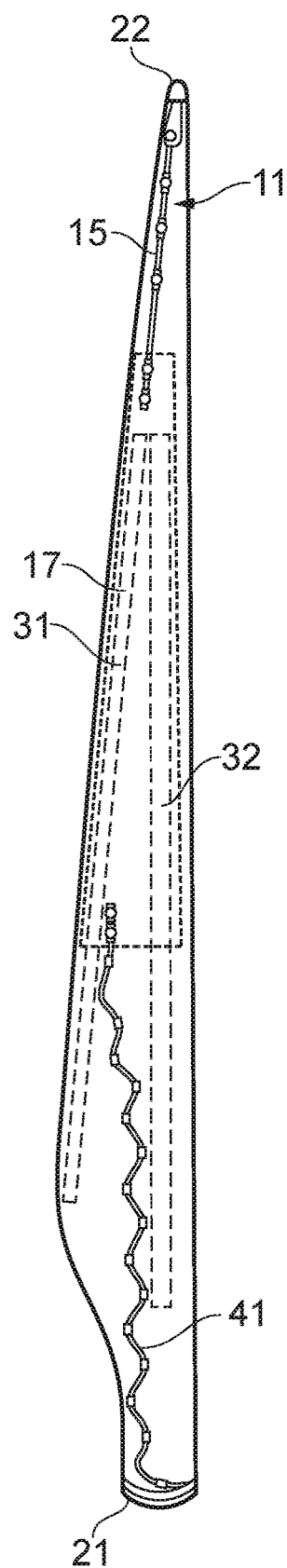
FIG. 3 shows a layout of a blade having a known lightning protection system.
Figure 4:
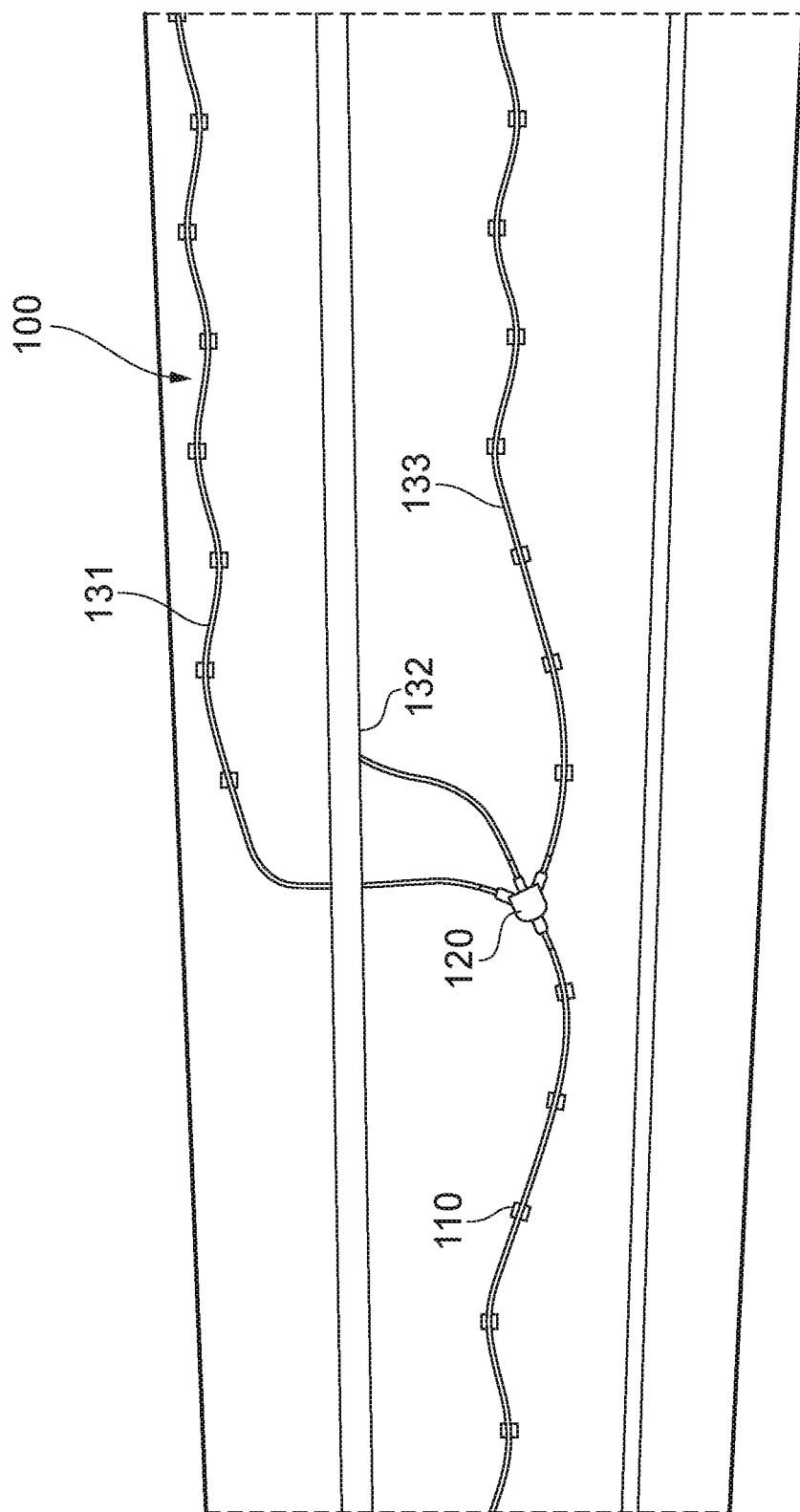
FIG. 4 shows part of an inboard portion of a blade having a lightning protection system of a first example.

With reference to FIG. 3, the wind turbine blade 20 has a prior art lightning protection system 11. The lightning protection system 11 provides a lightning current path from a variety of likely lightning attachment points on the blade, via a down conductor system, to the root end 21 of the blade. At the root end 21 there may be electrically conductive slip rings or bands which provide electrical connection to the hub 18 and/or nacelle 14 of the wind turbine 10 yet allow pitch rotation of the blade relative to the hub. The hub 18 and/or nacelle 14 are electrically connected to ground to provide a lightning current path from the blade to ground.

The down conductor of the lightning protection system 11 may comprise: a tip down conductor cable 15; an electrically conductive metal foil 17 just inboard of an outer surface of the blade 20; and an inboard down conductor cable 41. There may be provided a layer, e.g. a glass layer, covering the electrically conductive metal foil 17. The electrically conductive metal foil 17 may have a mesh configuration or be an expanded metal foil. The blade 20 may have a lightning tip receptor such as a solid metal tip and a plurality of discrete lightning receptors on the surface of the blade 20 near the tip 22. The solid metal tip and the discrete lightning receptors may be electrically connected to the tip down conductor cable 15. The root end of the tip down conductor cable 15 may be electrically connected to the tip end of the electrically conductive metal foil 17. The tip end of the inboard down conductor cable 41 may be electrically connected to the root end of the electrically conductive metal foil 17. The root end of the inboard down conductor cable 41 may be electrically connected to the slip rings at the root end 21 of the blade. The electrically conductive metal foil 17 may be omitted and the down conductor may be a cable extending from the root end to the tip end of the blade. The down conductor may alternatively have a down conductor cable extending in parallel with the conductive metal foil over part of the blade length.

The wind turbine blade 20 has a spanwise dimension 25 extending between the root and tip ends 21, 22; and an inboard portion 23 extending up to 50% of the spanwise dimension 25 from the root end 21 towards a midpoint 26 between the root and tip ends 21, 22, for example, as shown in FIG. 2. The inboard portion 23 may extend up to 40% of the spanwise dimension from the root end 21 towards the tip end 22; preferably up to 30% of the spanwise dimension 25 from the root end 21 towards the tip end 22. The blade 20 may also have an outboard portion 24 extending at least up to the inboard portion 23, of the spanwise dimension 25 from the tip end 22 to the root end 21. The outboard portion 24 may extend up to 50% of the spanwise dimension 25 from the tip end 22 towards the root end 21.

The wind turbine blade 20 may also comprise at least one electrically conductive component 31, 32. The at least one electrically conductive component 31, 32 is disposed at least partly in the inboard portion 23. The at least one electrically conductive component 31, 32 may comprise a structural spar cap. The spar cap 31, 32 may comprise carbon fibres. The carbon fibres may be pultruded carbon fibres. The pultruded carbon fibres may extend substantially spanwise along a portion of the blade 20. There may be provided a first and a second spar cap. The first spar cap may be provided on a pressure side of the blade. The second spar cap may be provided on a suction side of the blade. There may be one or more shear webs extending between the first and second spar caps. There may be provided a leading pair and a trailing pair of spar caps. Each pair of spar caps may comprise a first and a second spar cap, and optionally a shear web extending therebetween. Each of the first and second spar caps may be integrated into the shell of the blade 20. Alternatively, the spar caps may be attached to an interior surface of the shell of the blade 20. Further alternatively some of the spar caps may be integrated into the shell and some of the spar caps may be attached to an interior surface of the shell.

FIGS. 4 to 7 show a first example of a lightning protection system 100 with a diverging electrical junction to distribute lightning current in order to minimise any interaction between the lightning protection system and an electrically conductive component 31, 32.

The lightning protection system 100 comprises: a down conductor 110; a diverging electrical junction 120 and a plurality of inboard down conductor cables 131, 132, 133. The lightning protection system 100 is configured so as to conduct electricity through the down conductor 110, through the diverging electrical junction 120, through the plurality of inboard down conductor cables 131, 132, 133, towards the root end 21 of the blade 20. An advantage of the diverging junction 120 to split the down conductor cable 110 into a plurality of inboard down conductor cables 131, 132, 133 is that the current passing through each of the plurality of inboard down conductor cables 131, 132, 133 is reduced. This reduces the potential difference between an electrically conductive component and any individual down conductor cable 131, 132, 133, and in turn reduces the likelihood of flashover between one of the down conductor cables 131, 132, 133 and an electrically conductive component. In addition, the distribution of current between the plurality of inboard down conductor cables reduces the heat build-up in these cables and may also allow the use of smaller diameter cables.

The down conductor 110 may comprise a down conductor cable. The down conductor 110 may be at least partly disposed in the inboard portion 23 of the blade 20. The down conductor 110 may be substantially or wholly disposed in the inboard portion 23 of the blade 20.

The diverging electrical junction 120 may be disposed in the inboard portion 23 of the blade 20. The diverging electrical junction 120 has the function of splitting out an electrical path from the down conductor 110 into multiple paths, as the path moves from the tip end 22 to the root end 21 within the inboard portion 23. The diverging electrical junction 120 may be provided as a port or ports, to which the plurality of inboard down conductor cables 131, 132, 133 may be connected. The plurality of inboard down connector cables 131, 132, 133 may each have a tip end, and may each be electrically connected to the diverging electrical junction 120 at their tip end. The plurality of inboard down connector cables 131, 132, 133 may each be connected to the electrical junction 120 proximate one another. The plurality of inboard down connector cables 131, 132, 133 may each be connected to the electrical junction 120 so as to define acute angles therebetween, such that the plurality of inboard down connector cables 131, 132, 133 may extend away from the diverging electrical junction 120 and in doing so extend away from one another. The diverging electrical junction 120 may be arranged such that the plurality of inboard down conductor cables 131, 132, 133 at least partly overlap with the electrically conductive component 31, 32. This overlap may be in a spanwise direction of the blade 20.

The plurality of inboard down conductor cables 131, 132, 133 may be arranged electrically in parallel to one another, and may be disposed in the inboard portion 23. The plurality of inboard down conductor cables 131, 132, 133 may each be provided with an electrically conductive core, and/or an electrically insulative sheath. The plurality of inboard down conductor cables 131, 132, 133 may each be substantially flexible. The plurality of inboard down conductor cables 131, 132, 133 may each be the same or substantially the same as one another. The plurality of inboard down conductor cables 131, 132, 133 may comprise any appropriate number of down conductor cables. The plurality of inboard down conductor cables 131, 132, 133 may comprise at least three down conductor cables, for example as shown in FIGS. 4 to 7. The plurality of inboard down conductor cables 131, 132, 133 may be arranged so as to extend in substantially the same direction as a spanwise extension of a shear web of the blade. The plurality of inboard down conductor cables 131, 132, 133 may be arranged so as to extend to each side of a shear web of the blade. The plurality of inboard down conductor cables 131, 132, 133 may be arranged such that the shear web extends at least partly between at least two of the plurality of inboard down conductor cables 131, 132, 133.

The plurality of inboard down conductor cables 131, 132, 133 may be spaced apart from one another away from the diverging electrical junction 120. The plurality of inboard down conductor cables 131, 132, 133 may comprise at least one down conductor cable 131, 132, 133 on or proximate a blade neutral axis.

The plurality of inboard down conductor cables 131, 132, 133 may comprise at least one down conductor cable 131, 132, 133 substantially disposed between a leading edge 28 and a shear web of the blade 20, or between a trailing edge 29 and a shear web of the blade 20, or substantially disposed at or proximate to the leading edge 28 of the blade 20.

Figure 5:
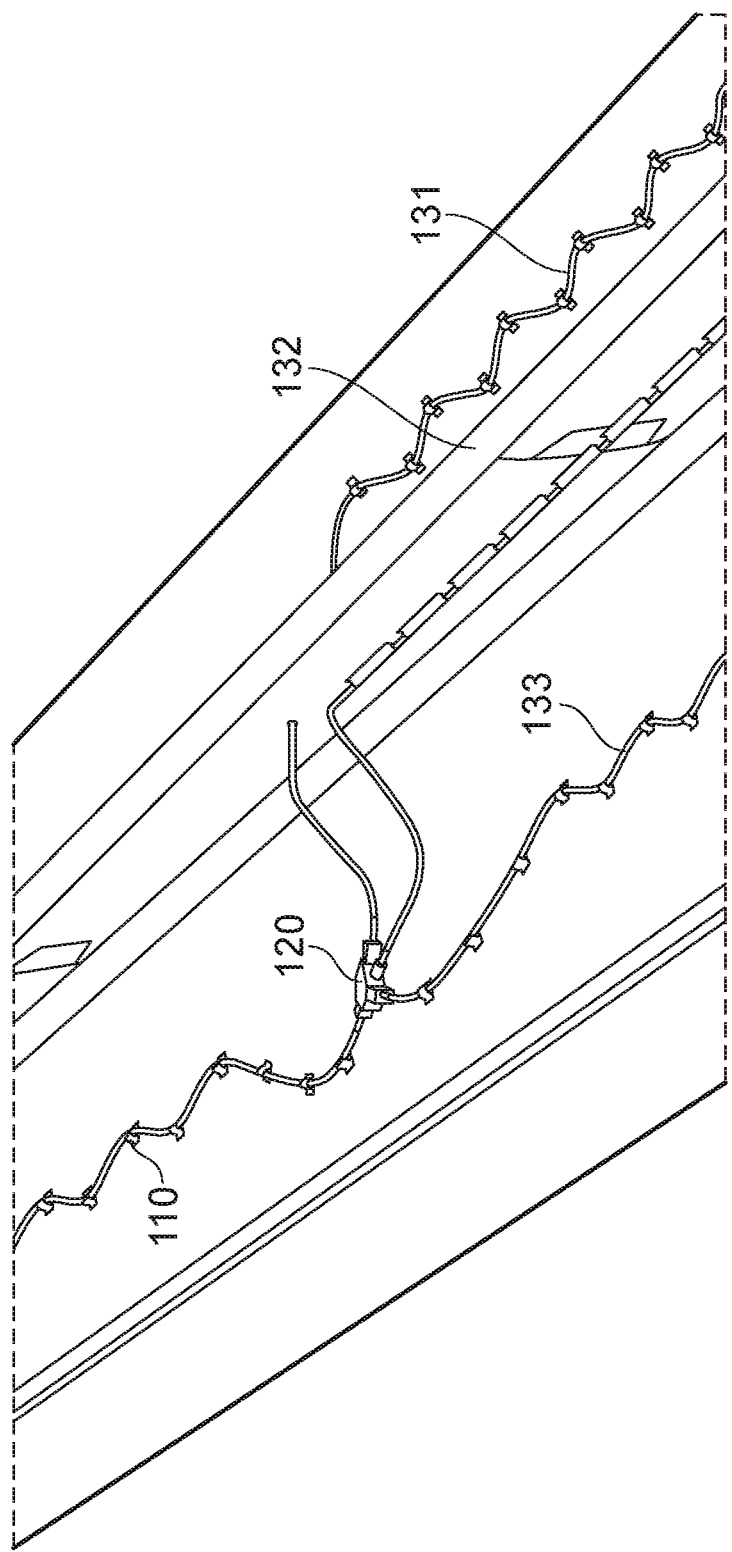
FIG. 5 shows a perspective view of the portion of the blade of FIG. 4.
Figure 6:
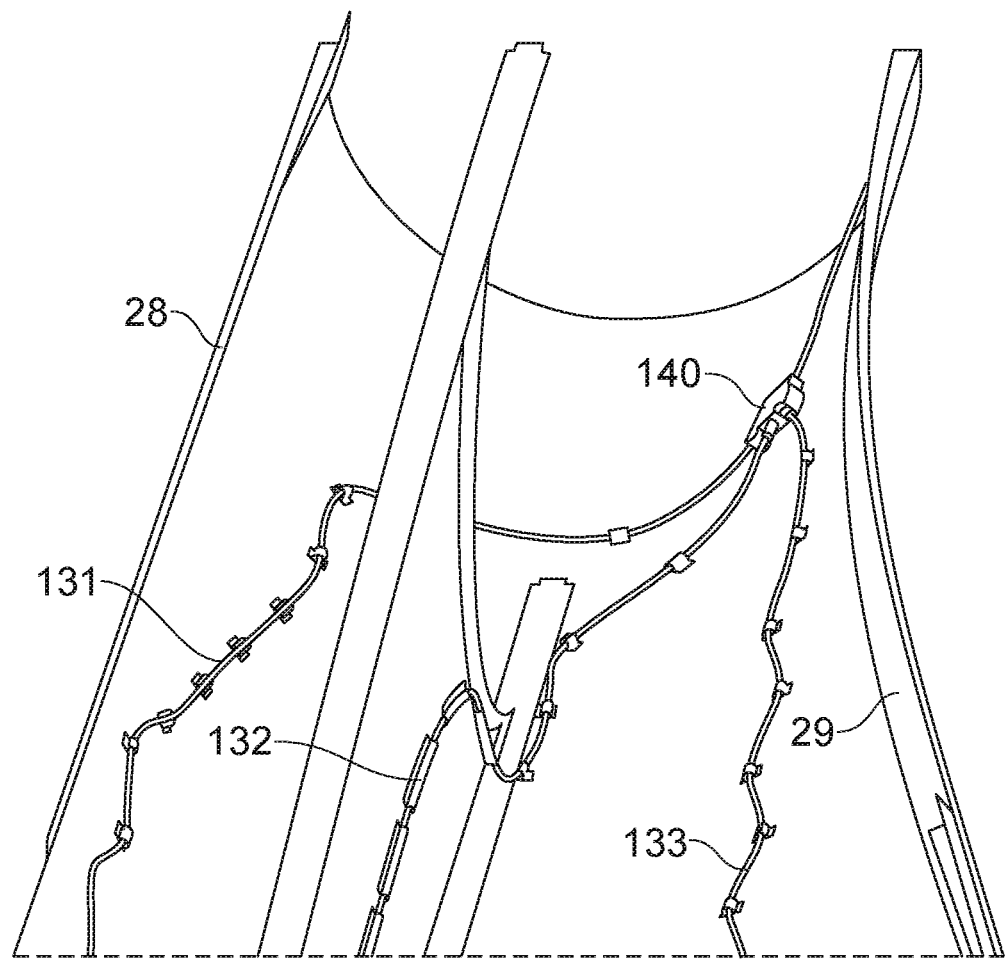
FIG. 6 shows a part of an inboard portion of a blade having a lightning protection system of the first example.
Figure 7:
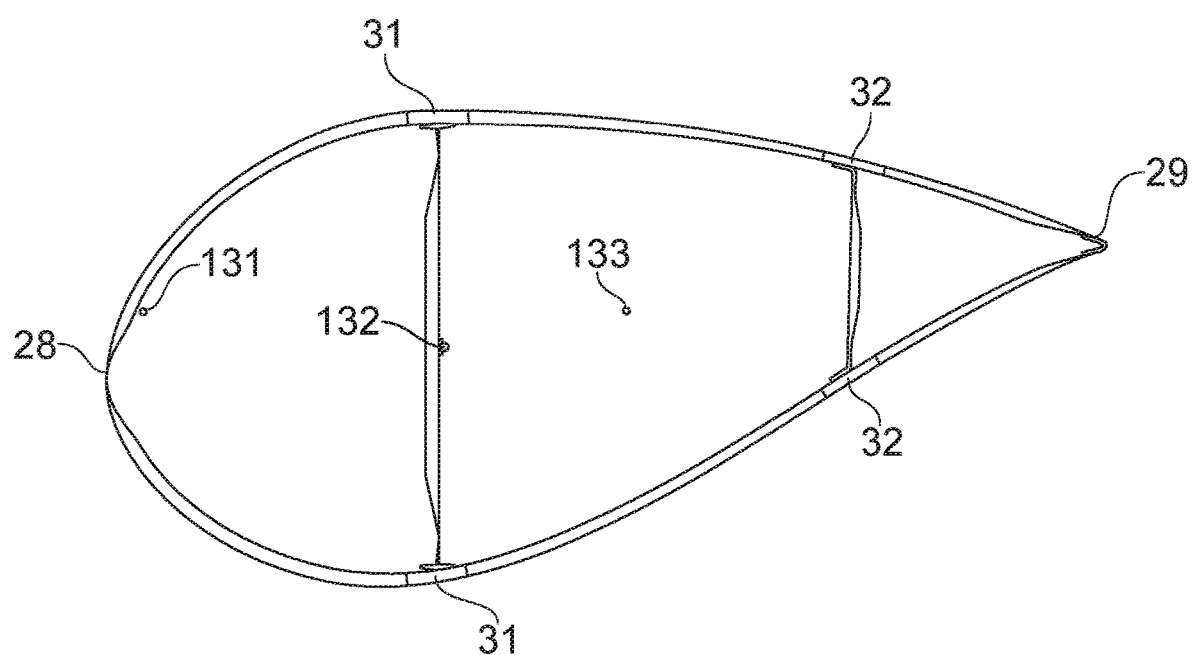
FIG. 7 shows a cross-section through a blade having a lightning protection system of the first example.

The plurality of inboard down conductor cables 131, 132, 133 may comprise at least one down conductor cable 131 attached to an interior surface of an outer shell of the blade 20, for example as shown in FIG. 7. At least one of the down conductor cables 131, 132, 133 may be arranged in an at least partly meandering configuration, or arranged so as to be substantially straight, for example as shown in FIGS. 5 and 6, in which the outer two of the plurality of inboard down conductor cables 131, 133 are in an at least partly meandering configuration, and the inner cable 132 is substantially straight. The meandering configuration may be configured so as to accommodate any dimensional changes of any component to which the cable is attached. For example, away from the blade neutral axis, the blade structure will bend under load and it is undesirable to transfer this bending load to the down conductor cable. By providing a meandering path for the down conductor cable, the cable can be insulated from these blade bending loads. Conversely, at the neutral axis of the blade, the down conductor cable path may be substantially straight, so as to save the cost and weight of unnecessary cable length.

The plurality of inboard down conductor cables 131, 132, 133 may comprise at least one down conductor cable substantially disposed at or proximate a shear web of the blade 20, for example as shown with the inner cable 132 in FIG. 6. At least one of the plurality of inboard down conductor cables 131, 132, 133 may be attached to a shear web of the blade 20. This attachment may be such that the at least one of the plurality of inboard down conductor cables 131, 132, 133 is restricted or prevented from movement in a chordwise direction of the blade 20.

At least one of the down conductor cables 131, 132, 133 may pass through an aperture in a shear web of the blade 20. The aperture may be configured having a diameter through which the at least one of the down conductor cables can pass. An area of the aperture may correspond to a cross-sectional area of the cable that passes therethrough, e.g. so as to provide a clearance fit between the cable and the shear web. The shear web may have a height (in the blade thickness direction), and the aperture may be provided mid-way along the height of the shear web.

The lightning protection system 100 may comprise an outboard down conductor 110 disposed in the outboard portion 24 of the blade 20. The outboard down conductor 110 may be the same or substantially the same as any of the down conductors described in relation to FIG. 3, or shown in FIG. 3.

The wind turbine blade 20 may further comprise an electrically conductive metal outer foil 17 on an outer surface of the blade 20. The metal foil 17 may extend around an outside of the blade, so as to cover an outer surface of the shell of the blade 20. The metal foil may extend along only a part of the span of the blade 20. The metal foil 17 may be arranged so as to be in both of the inboard and outboard portions 23, 24 of the blade 20. The metal foil 17 may be disposed mostly in an outboard portion 24 of the blade 20. The metal foil 17 may be a curved sheet of metal. The metal foil 17 may be substantially frustoconical in shape.

At least one of the plurality of inboard down conductor cables 131, 132, 133 may be either:

arranged electrically in parallel with the metal foil 17; or arranged electrically in series with the metal foil 17.

Where at least one of the plurality of inboard down conductor cables 131, 132, 133 is arranged electrically in series with the metal foil 17, the down conductor cable 131, 132, 133 may be attached to the metal foil 17. The attachment may be achieved directly and/or may be achieved by an attachment component.

The outer foil 17 may be the diverging electrical junction 120. For example, at least two of the plurality of inboard down conductor cables 131, 132, 133 may be attached to the outer foil 17, for example at a root end of the outer foil 17.

The lightning protection system 100 may comprise a converging electrical junction 140 disposed in the inboard portion 23, electrically connected to the plurality of inboard down conductor cables 131, 132, 133. The converging electrical junction 140 may be disposed closer to the root end 21 of the blade 20 than the plurality of inboard down conductor cables 131, 132, 133. The converging electrical junction 140 has the function of joining electrical paths from the plurality of inboard down conductor cables 131, 132, 133, into less paths, preferably a single path, as the paths move towards the root end 21, within the inboard portion 23.

The converging electrical junction 140 may be disposed closer to the root end 21 of the blade 20 than the electrically conductive component 31, 32. At a location closer to the root end 21 of the blade 20 than the electrically conductive component 31, 32, there is a significantly reduced risk of flashover between a down conductor cable and the electrically conductive component. For example, the electricity conductive component may be terminated at a spanwise distance further outboard than the converging electrical junction 140. Inboard of the converging electrical junction 140, the plurality of conductor cables 131, 132, 133 can be brought together to form a single or reduced number of current flow paths in a single or reduced number of down conductor components or cables.

The converging electrical junction 140 may be spaced apart from the electrically conductive component 31, 32. The converging electrical junction 140 may be secured in place, so as to be held in place away from the electrically conductive component 31, 32. The converging electrical junction 140 may be substantially the same in shape, size, materials, and/or configuration as the diverging electrical junction 120. The converging electrical junction 140 may be arranged so as to substantially be a mirror-reflection of the diverging electrical junction 120. The converging electrical junction 140 and attached down conductor cables 131, 132, 133 may be arranged so as to substantially be a mirror-reflection of the diverging electrical junction 120 and attached down conductor cables 131, 132, 133.

Figure 8:
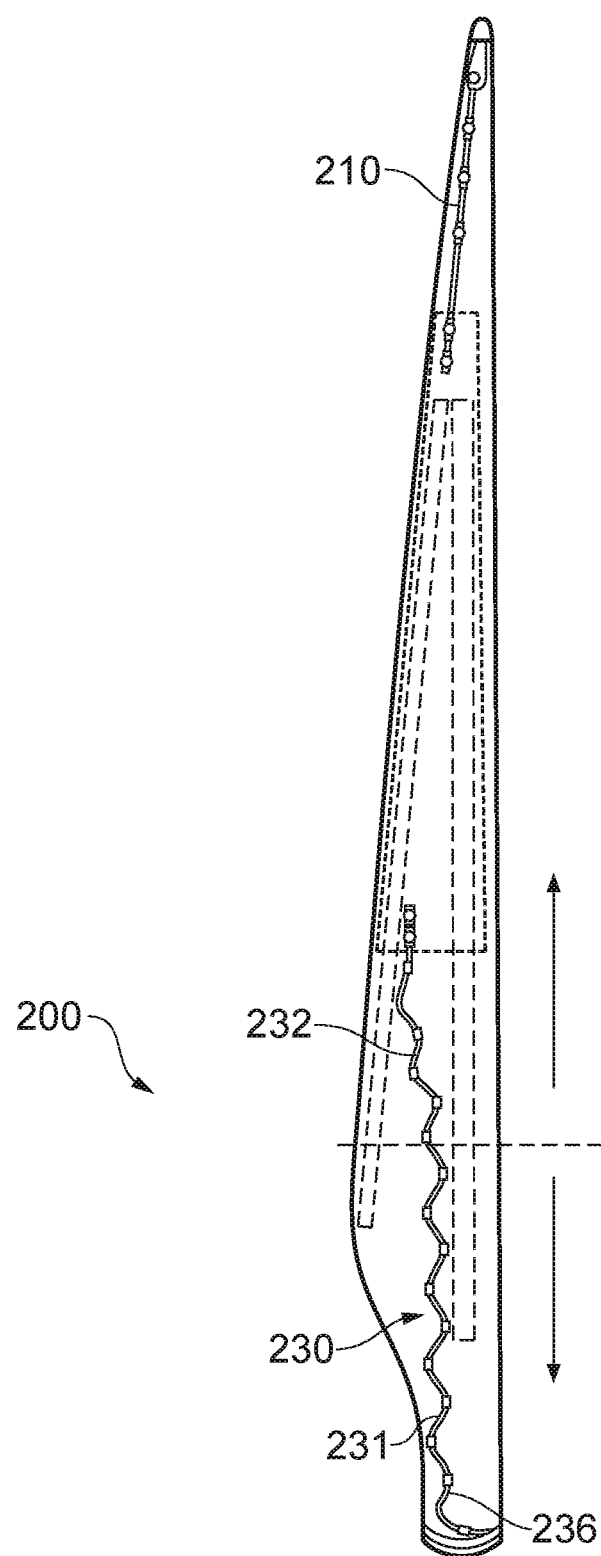
FIG. 8 shows a layout of a blade having a lightning protection system of a second example.

FIG. 8 shows a second example with a blade having a lightning protection system where parts of the cable have different electrical insulation levels, i.e. different electrical breakdown voltages. This allows the parts of the cables to be routed closer to electrically conductive components 31, 32 and/or the prevention of flashover between the lightning protection system and the electrically conductive component.

The lightning protection system in FIG. 8 comprises a down conductor cable 230 at least partly disposed inside the inboard portion 23 of the blade 20. The down conductor cable 230 may be disposed substantially, or wholly, inside the inboard portion 23 of the blade 20. The down conductor cable 230 may extend to the root end 21 of the blade 20, or be electrically connected to an electrically conductive component, such as a cable, that extends to the root end 21 of the blade 20.

The down conductor cable 230 comprises a cable first portion 231 and a cable second portion 232. The cable first portion 231 is closer to the root end 21 of the blade 20 than the cable second portion 232. Both of the first and second cable portions 231, 232 may be disposed in the inboard portion 23 of the blade 20. Each cable portion 231, 232 has insulation having an electrical breakdown voltage. The cable electrical breakdown voltage of the first portion 231 insulation is higher than the electrical breakdown voltage of the cable second portion 232 insulation. Approaching the root end 21 of the blade 22, the potential difference between any down conductor cable and any electrically conductive component 31, 32 tends to increase. In turn, the likelihood of flashover from a down conductor cable to an electrically conductive 31, 32 component increases. By providing a first portion having insulation having a higher electrical breakdown voltage at a root end 21 of the blade 20, the risk of flashover is substantially mitigated at a location where the potential difference is highest. By providing a first portion 231 having a higher electrical breakdown voltage than a second portion, the flashover mitigation is heightened where the potential difference is highest.

The cable second portion 232 may overlap at least partly with the at least one electrically conductive component 31, 32 of the blade in a spanwise direction of the blade 20. The cable first portion 231 may overlap at least partly with the at least one electrically conductive component 31, 32 of the blade in a spanwise direction of the blade 20.

The difference in electrical breakdown voltage between the cable first portion 231 and the cable second portion 232 may arise from one or more of: thickness; material; or shape of the insulation surrounding the conductor.

There may be provided a cable third portion 236, disposed closer to the root end 21 of the blade 20 than the cable first portion 231, and electrically connected to the cable first portion 231. The cable third portion 236 may have insulation having an electrical breakdown voltage lower than the electrical breakdown voltage of the cable first portion 231 insulation. The cable third portion insulation electrical breakdown voltage may be the same as the cable second portion 232 insulation electrical breakdown voltage. The cable third portion 236 may be disposed closer to the root end 21 of the blade 20 than one or more electrically conductive components 31, 32 of the blade 20. The cable third portion 236 may be spaced away, in a spanwise direction, from one or more electrically conductive components 31, 32 of the blade 20.

The lightning protection system 200 may comprise an outboard down conductor 210 disposed in the outboard portion 24 of the blade 20, the outboard down conductor 210 having insulation having a higher breakdown voltage than the cable second portion 232. The outboard down conductor 210 may be an outboard down conductor cable. The outboard down conductor 210 may have insulation having a breakdown voltage higher than the cable first portion 231 insulation. This has the advantage of preventing attachment of lightning directly to the outboard down conductor 210. This provides a more reliable path for current to follow which does not circumvent the conductive solid metal tip 22 or other lightning receptors of the blade 20. Instead the lightning will attach to the tip 22 or other lightning receptors of the blade 20 and the current will then pass through the outboard down conductor 210.

The, or at least one of the, down conductor cables 210, 230 may be spaced apart from at least one electrically conductive component 31, 32 of the blade 20.

The wind turbine blade 20 may further comprise an electrically conductive metal foil 17 as described previously. The down conductor cable 210 may arranged in relation to the metal foil 17 as described previously.

The at least one electrically conductive component 31, 32 may comprise a spar cap, which may be configured as described previously.

The or each cable 210, 230 may comprise an electrically conductive core and/or an electrically insulative sheath. The respective cable insulation electrical breakdown voltage may be provided by the sheath. The sheath may be a layer, coating and/or be tubular in shape.

The down conductor cable 230 may be arranged in an at least partly meandering configuration, for example as shown in FIG. 8.

FIGS. 9 to 15 show a third example where the distance between a down conductor cable and any electrically conductive component can be maximised.

The wind turbine blade 20 comprises at least one electrically conductive component 31, 32 and a lightning protection system 300. The at least one electrically conductive component 31, 32 is disposed at least partly in the inboard portion 23.

The lightning protection system 300 comprises a down conductor cable portion 330 and a supporting component 340.

Figure 9:
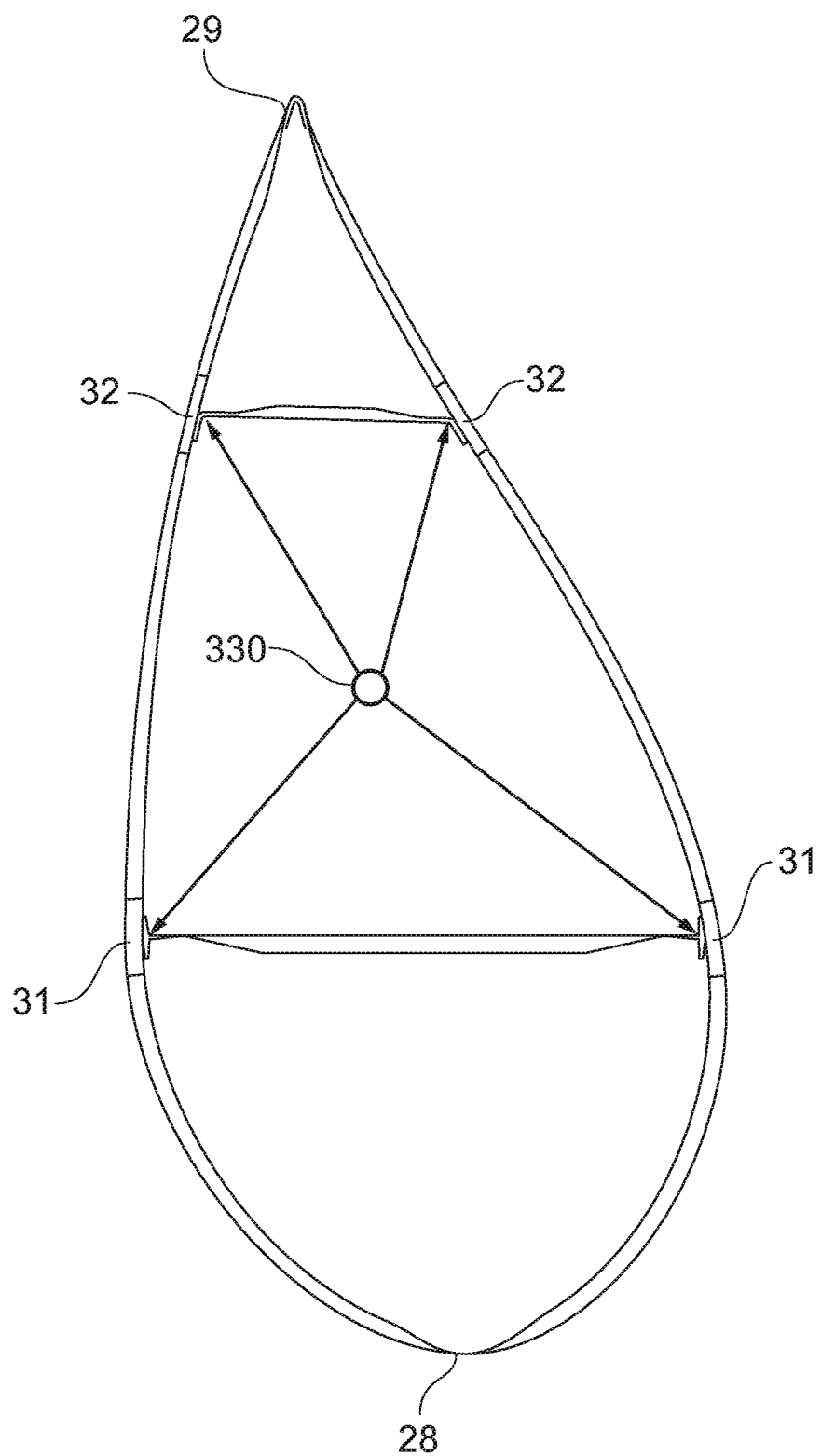
FIG. 9 shows a cross-section of a blade having a lightning protection system of a third example.

The down conductor cable portion 330 is disposed inside the inboard portion 23 of the blade 20. The down conductor cable portion 330 is secured and suspended in free space by the supporting component 340 in a position near or on the camber line of the blade aerofoil section, for example as shown in FIG. 9, spaced away from the at least one electrically conductive component 31, 32. As demonstrated by the arrows in FIG. 9, the down conductor cable portion 330 may be secured and suspended in free space at a maximum distance from each of the electrically conductive components 31, 32.

As a skilled person will appreciate, the term "free space" used herein refers to space within the blade 20, occupied by the down conductor cable portion 330 and the supporting component 340, that is not occupied by another component of the blade 20. In particular, free space is not occupied by any structural component of the blade 20. For example, space that accommodates a shear web is not free space. Space between two shear webs, or a shear web and an edge of the blade, may be free space.

An advantage of utilising free space within the blade 20 to accommodate the down conductor cable portion 330 is that the distance between the down conductor cable portion 330 and any electrically conductive component 31, 32 can be maximised. By increasing the distance between the down conductor cable portion 330 and any electrically conductive component, the risk of flashover between the down conductor cable portion 330 and any electrically conductive component may be eliminated.

The down conductor cable portion 330 may at least partly overlap with at least one electrically conductive component 31, 32 in a spanwise direction. The at least one electrically conductive component 31, 32 may comprise a spar cap, which may be configured as described previously.

The blade 20 may comprise a shell structure as described previously. In the case of two shell halves, each shell half may have an electrically conductive component. The down conductor cable portion 330 may be spaced substantially equally from both electrically conductive components 31, 32. The shell halves may be manufactured separately and then joined together during manufacture or the two shell halves may be manufactured together as a single shell.

Figure 10:
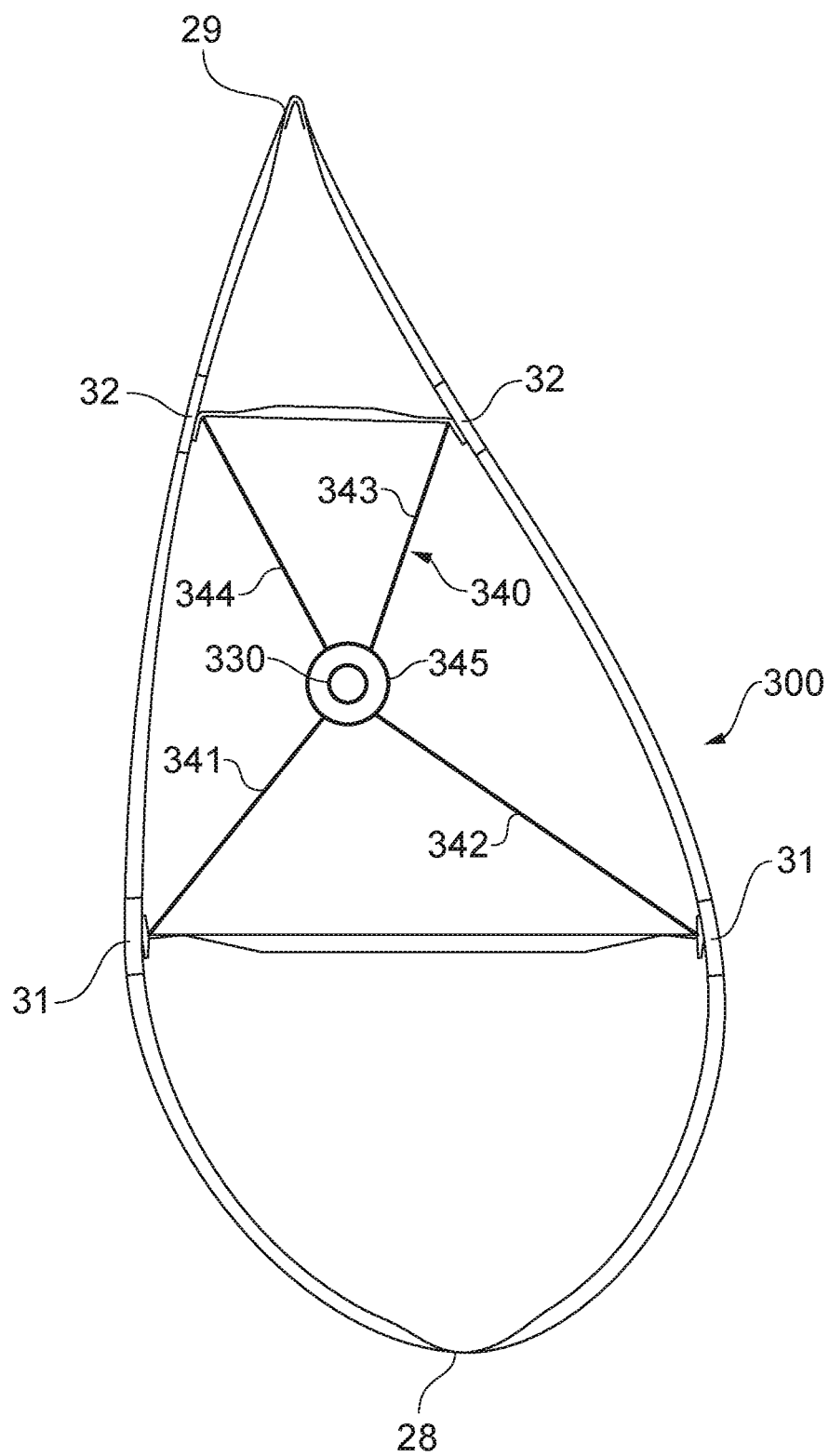
FIGS. 10 to 15 show a cross-section of various embodiments of a blade having a lightning protection system of the third example.
Figure 14:
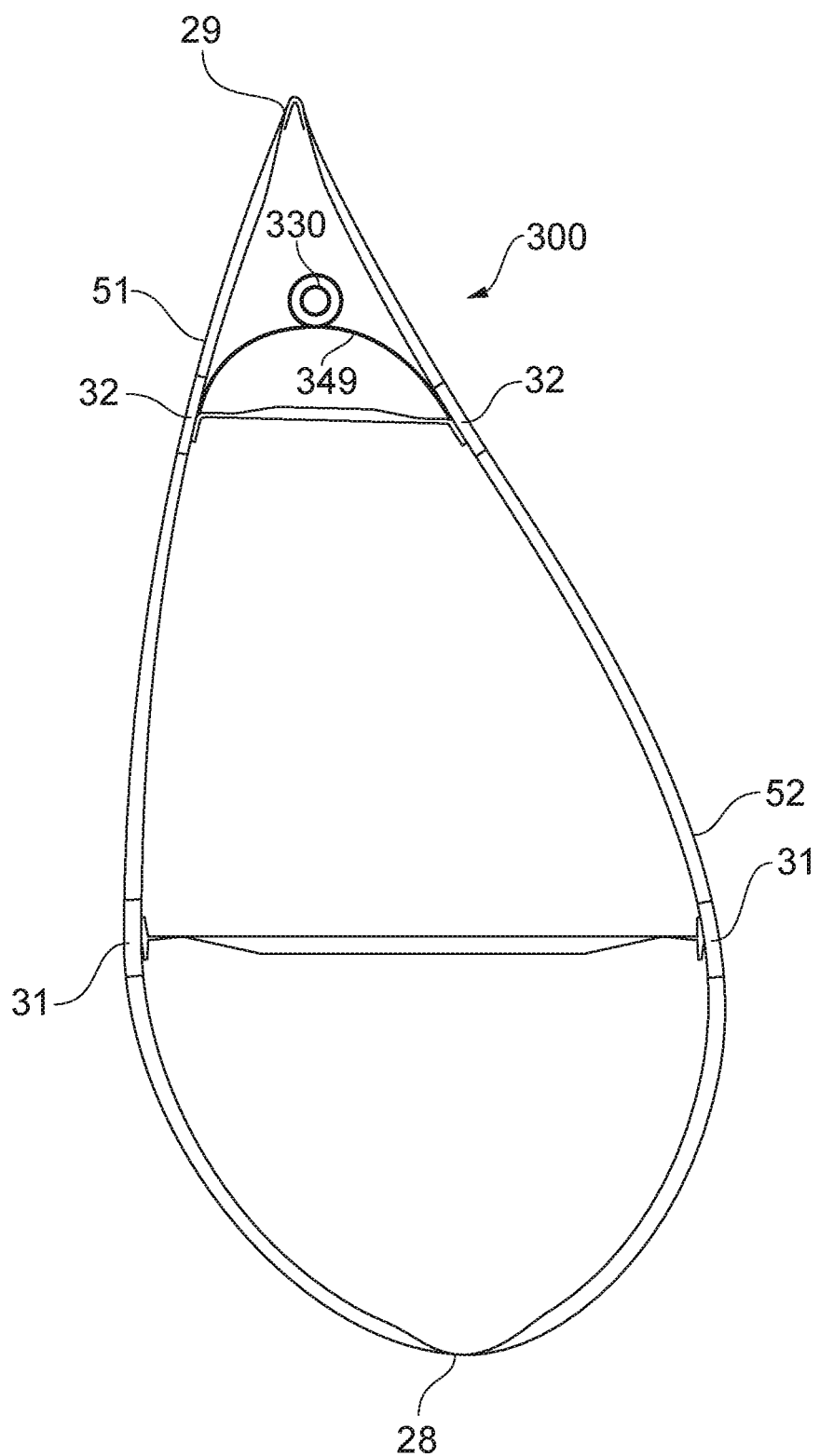
Figure 15:
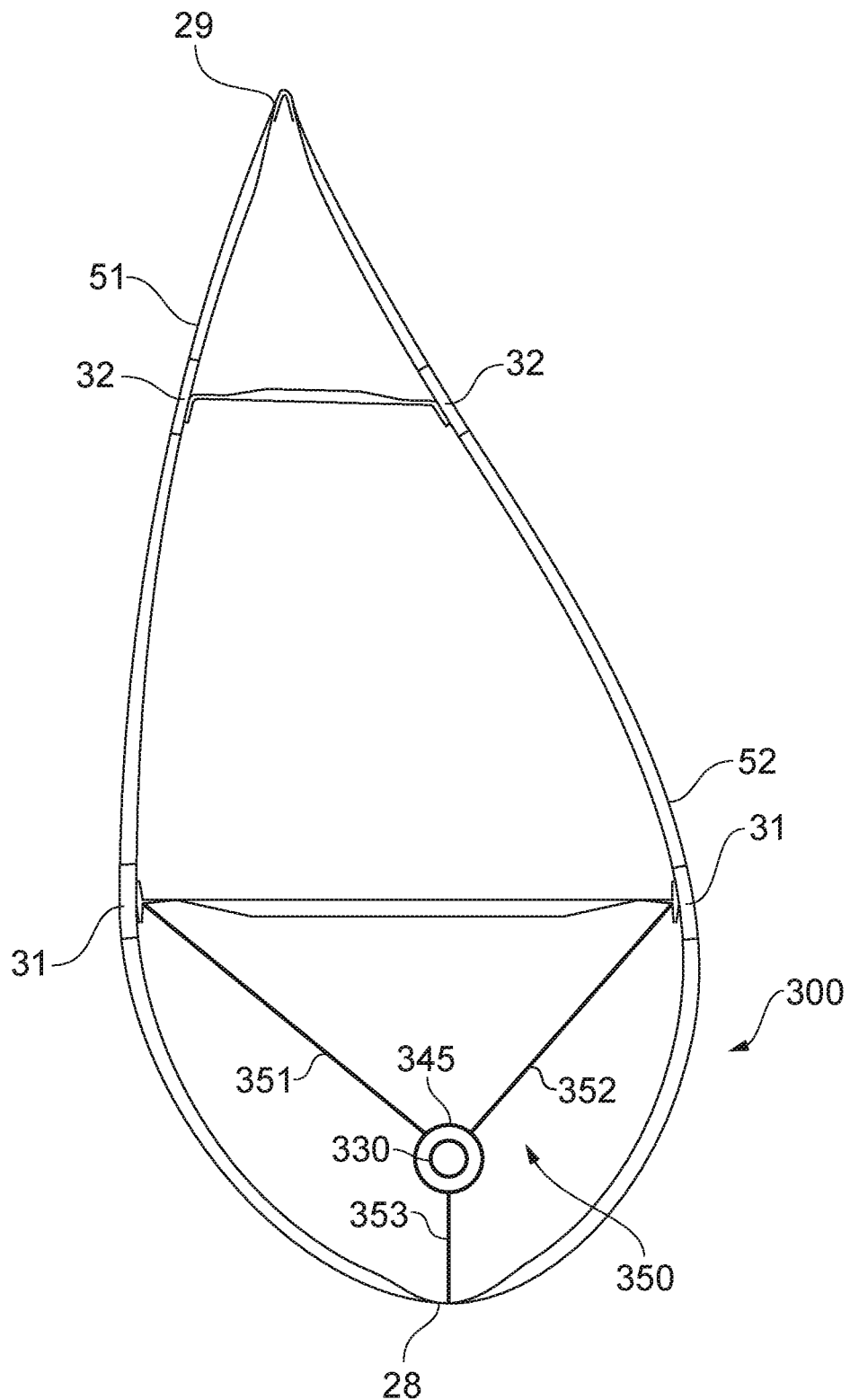

The blade 20 may comprise at least one shear web. The down conductor cable portion 340 may be secured in free space by the supporting component 340, spaced away from the at least one shear web. The supporting component 340 may be attached to the at least one shear web or at least one shell. The supporting component 340 may be attached to the at least one shear web at least two locations on the shear web, for example as shown in FIGS. 10, 14 and 15. The blade 20 may comprise at least two shear webs. The supporting component 340 may be attached to more than one of the at least two shear webs, for example as shown in FIG. 10. The down conductor cable portion 330 may be disposed substantially centrally between a pair of the at least two shear webs, for example as shown in FIGS. 9 and 10.

The supporting component 340 may be one or more of: a foam piece; a foam sack; a bracket, optionally an X-shaped bracket, a C-shaped bracket, a Y-shaped bracket; a straight beam, or rope or the like. The supporting component may be electrically non-conductive so that it does not compromise the down conductor system. The support component may also be designed to damp vibrations in the cable such that loads on the cable are reduced.

As shown in FIG. 10, the down conductor cable portion 330 may be held in place by a supporting component 340 having a plurality of struts 341, 342, 343, 344. The plurality of struts may comprise a first strut 341 attached to a first shear web, and/or a second strut 343 attached to a second shear web. The supporting component 340 may comprise a plurality of struts attached to a plurality of shear webs, such as two struts 341, 342 attached to a first shear web, and/or two struts 343, 344 attached to a second shear web. The struts 341, 342 attached to the first shear web may be attached at a pressure side end and a suction side end of the first shear web respectively. Equally, the struts 343, 344 attached to the second shear web may be attached pressure side end and a suction side end of the second shear web respectively. The struts 341, 342, 343, 344 may be arranged so as to extend towards a central point, at which the down conductor cable portion 330 is disposed. The struts 341, 342, 343, 344 may define a cross-shape in cross-section, and may be, for example, an X-shape bracket. The struts 341, 342, 343, 344 may be fixedly attached to a central supporting component 345. The central supporting component 345 may be fixedly attached to at least part of the down conductor portion 330, and/or act as a housing to at least part of the down conductor portion 330. The central supporting component 345 may define a ring-shape, and/or be substantially cylindrical.

Figure 11:
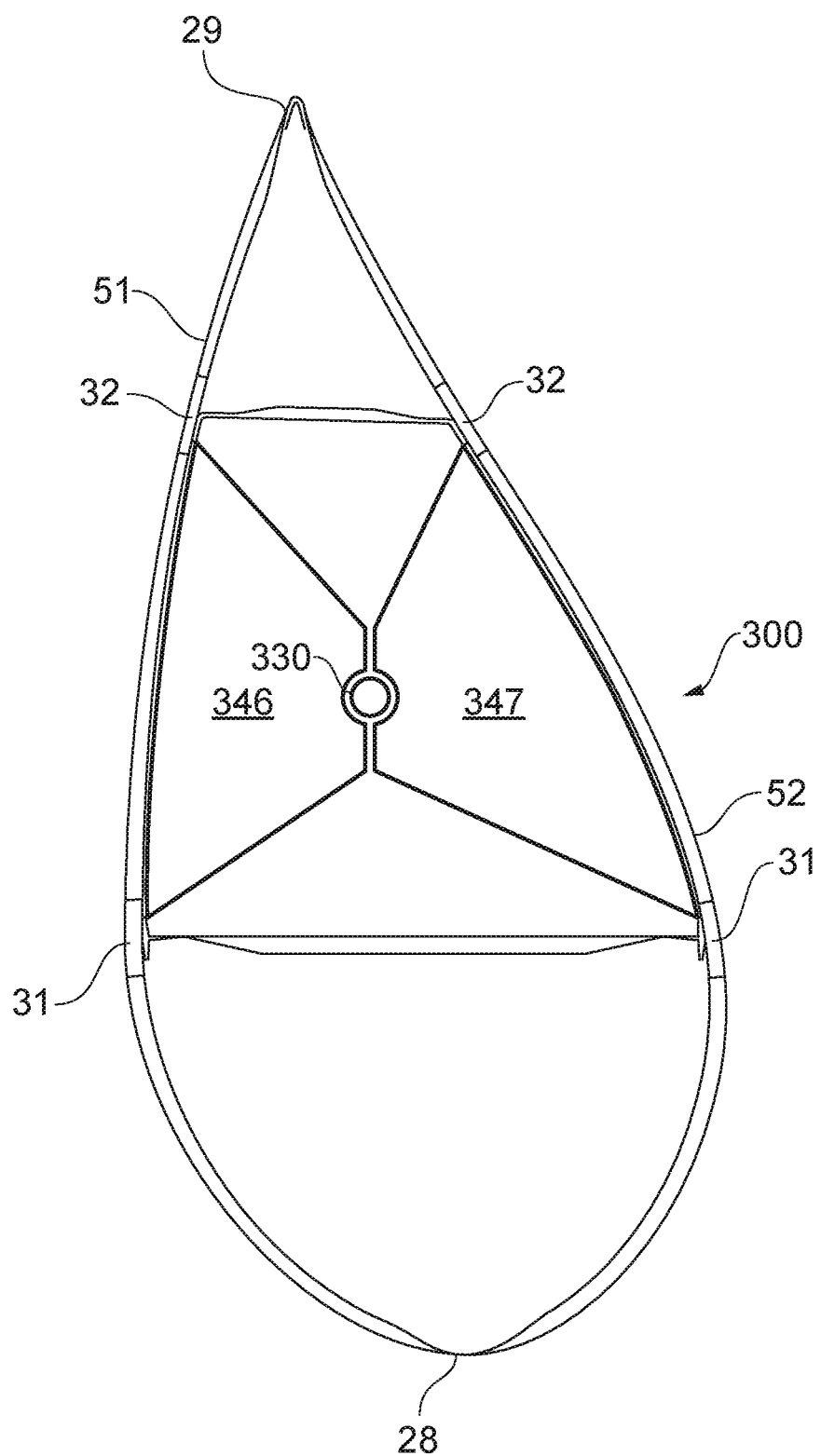

As shown in FIG. 11, the down conductor cable portion 330 may be held in place by a supporting component 340 having a plurality of pieces 346, 347. The plurality of pieces 346, 347 may secure the down conductor cable portion 330 between a leading edge 28 and a trailing edge 29 of the blade 20. The plurality of pieces 346, 347 may secure the down conductor cable portion 330 in compression between the plurality of pieces 346, 347. Additional attachment means may be provided, such as an attachment component, bracket, or adhesive. Additional attachment means may secure the down conductor cable portion 330 to at least one of the plurality of pieces 346, 367, and/or secure at least one of the plurality of pieces 346, 347 to a suction side 51 or a pressure side 52 of the blade 20. The plurality of pieces 346, 347 may be substantially solid, and/or wedge-shaped. The plurality of pieces 346, 347 may fill at least half of the space between at least two shear webs in the blade 20. The plurality of pieces 346, 367 may substantially fill the space between at least two shear webs. The plurality of pieces 346, 347 may be elastically compressible. The plurality of pieces 346, 347 may comprise or consist of foam. The or each foam piece 346 may be arranged so as to contact either a suction side 51 or a pressure side 52 of the blade 20. One of the plurality of pieces 346 may be arranged so as to contact, and/or be attached to, the suction side 51 of the blade 20. The other of the plurality of pieces 347 may be arranged so as to contact, and/or be attached to, the pressure side 52 of the blade 20. The plurality of pieces 346, 347 may be arranged so as to not bear against or be in contact with any shear web of the blade 20. The foam pieces 346, 347 may define an aperture therebetween, in which the down conductor cable portion 330 may be disposed or secured.

Figure 12:
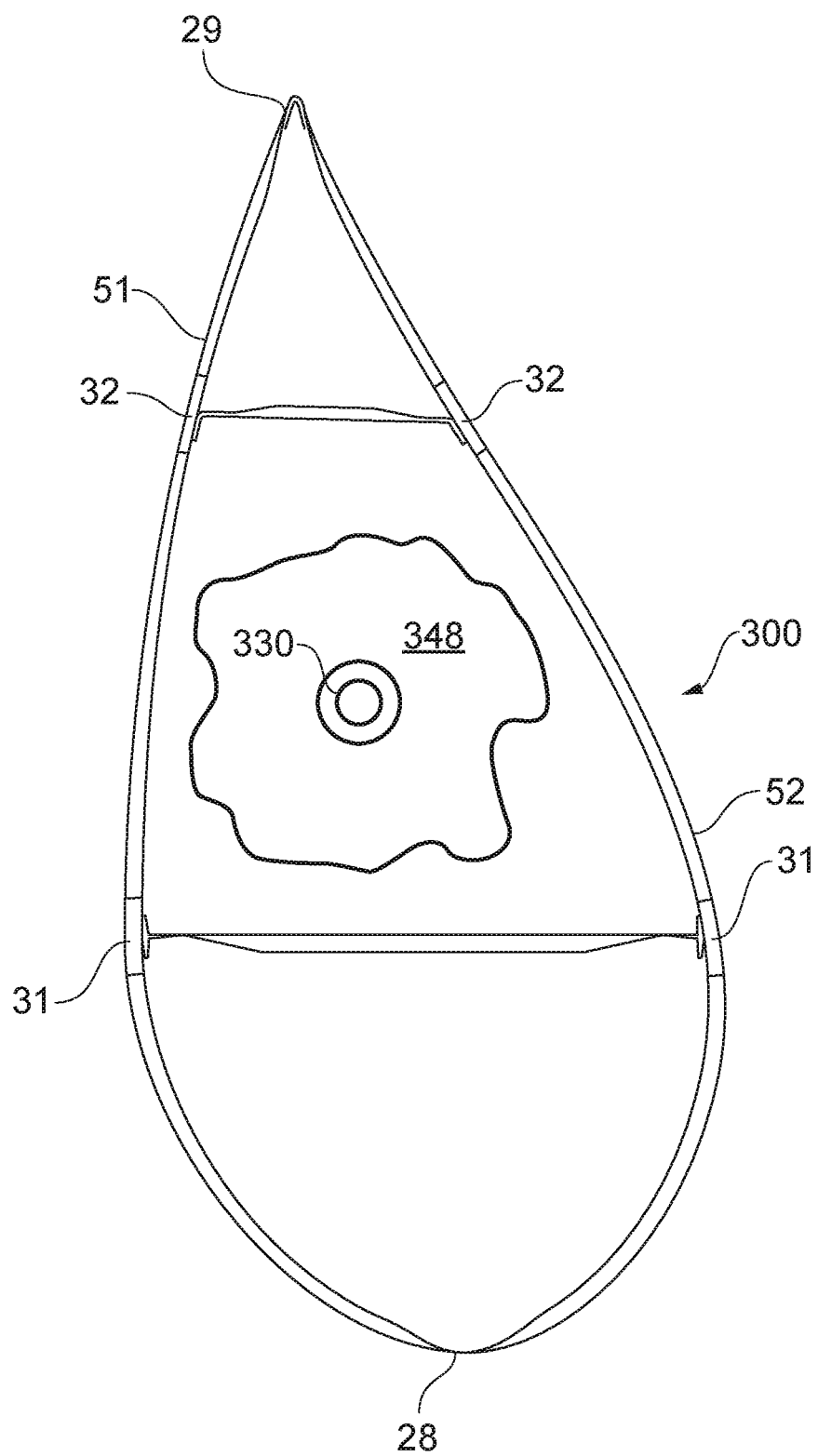
Figure 13:
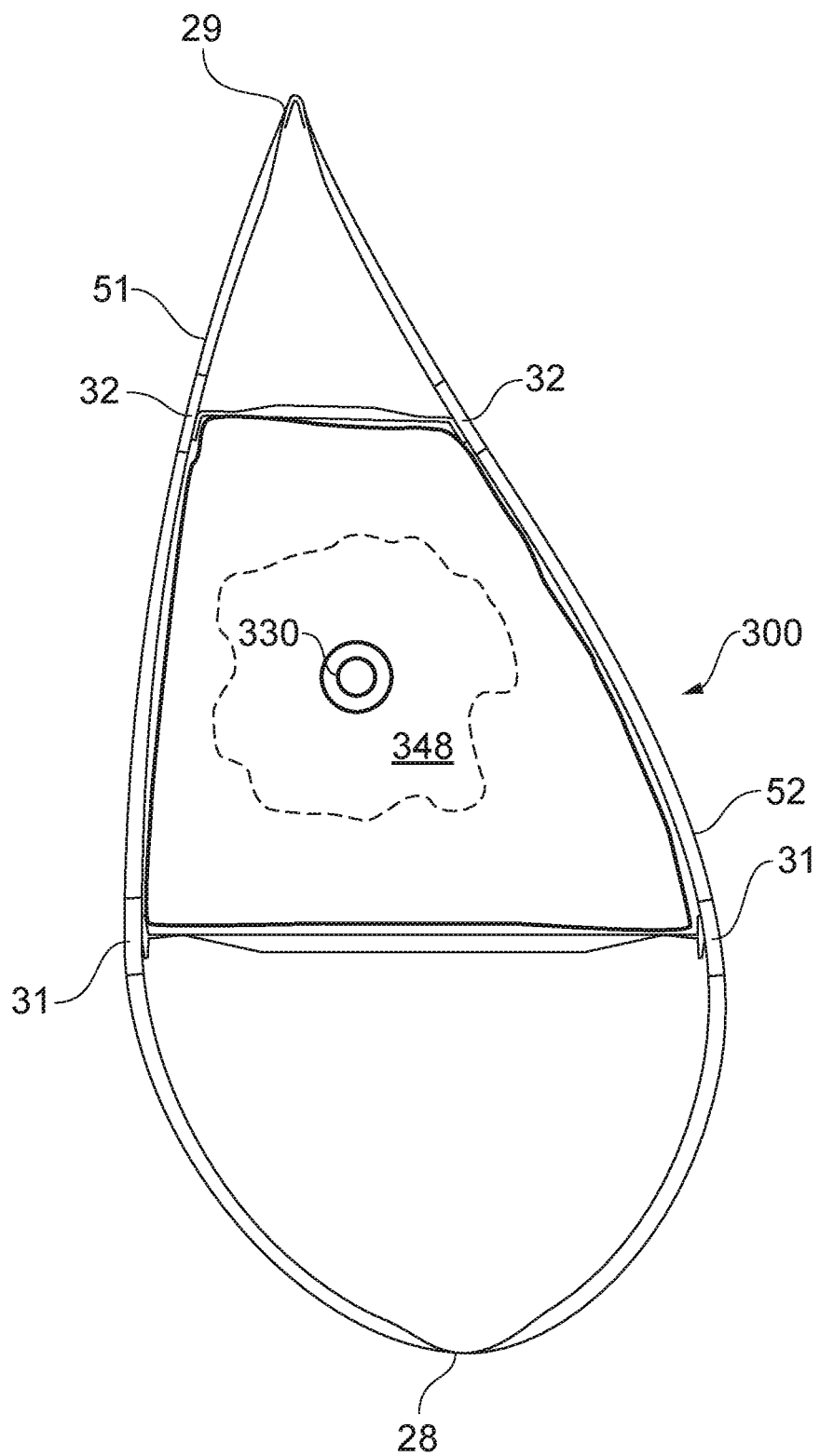

As shown in FIGS. 12 and 13, the down conductor cable portion 330 may be held in place by a supporting component 340 that is provided as a sack 348. The sack 348 may be inflatable. A partially inflated view of an embodiment of a sack 348 is shown in FIG. 12, and a fully inflated view of the sack 348 of FIG. 12 is shown in FIG. 13. The sack 348 may be provided with an aperture, which may be a central aperture, in which the down conductor cable portion 330 may be disposed. The sack 348 may at least substantially fill a free space in the blade 20, for example as shown in FIG. 13. The sack 348 may, in an inflated state, bear against a suction side 51 and/or a pressure side 52 of the blade 20. The sack 348 may, in an inflated state, bear against at least one shear web. The sack 348 may be disposed between two shear webs, and may bear against both shear webs in an inflated state. The sack 348 may bear against at least part of all of: the suction side 51, the pressure side 52, a first shear web, and a second shear web of the blade 20. The sack 348 may be elastically compressible in its inflated state. The sack 348 may be filled with a cured or curable material, such as a polymeric material. The sack 348 may be a foam sack.

As shown in FIG. 14, the down conductor cable portion 330 may be held in place by a bracket 349. The bracket 349 may be attached to a shear web. There may be provided a leading and a trailing shear web. The bracket 349 may be attached to the trailing shear web. The bracket 349 may at least partly extend towards a trailing edge 29 of the blade 20. The bracket 349 may be elastically compressible. The bracket 349 may be substantially C-shaped. The bracket 349 may be attached to a central supporting component 345. The central supporting component 345 may be fixedly attached to at least part of the down conductor portion 330, and/or act as a housing to at least part of the down conductor portion 330. The central supporting component 345 may define a ring-shape, and/or be substantially cylindrical.

As shown in FIG. 15, the down conductor cable portion 330 may be held in place by a bracket 350. The bracket 350 may be attached to a shear web. There may be provided a leading and a trailing shear web. The bracket 350 may be attached to the leading shear web. The bracket 350 may at least partly extend towards a leading edge 28 of the blade 20. The bracket 350 may be elastically compressible. The bracket 350 may be substantially Y-shaped. The bracket 350 may be attached to a central supporting component 345. The central supporting component 345 may be fixedly attached to at least part of the down conductor portion 330, and/or act as a housing to at least part of the down conductor portion 330. The central supporting component 345 may define a ring-shape, and/or be substantially cylindrical. The bracket 350 may comprise a plurality of struts 351, 352, 353. The plurality of struts 351, 352, 353 may be attached to and/or extend from the central supporting component 350. The central supporting component may be disposed between a leading edge 28 of the blade and a shear web, which may be a leading shear web. A first strut 351 of the plurality of struts 351, 352, 353 may be attached to and/or extend from a suction side end 51 of a shear web, which may be the leading shear web. A second strut 352 of the plurality of struts 351, 352, 353 may be attached to and/or extend from a pressure side end 52 of a shear web, which may be the leading shear web. A third 353 of the plurality of struts 351, 352, 353 may be attached to and/or extend from a leading edge 28 of the blade 20.

Figure 16:
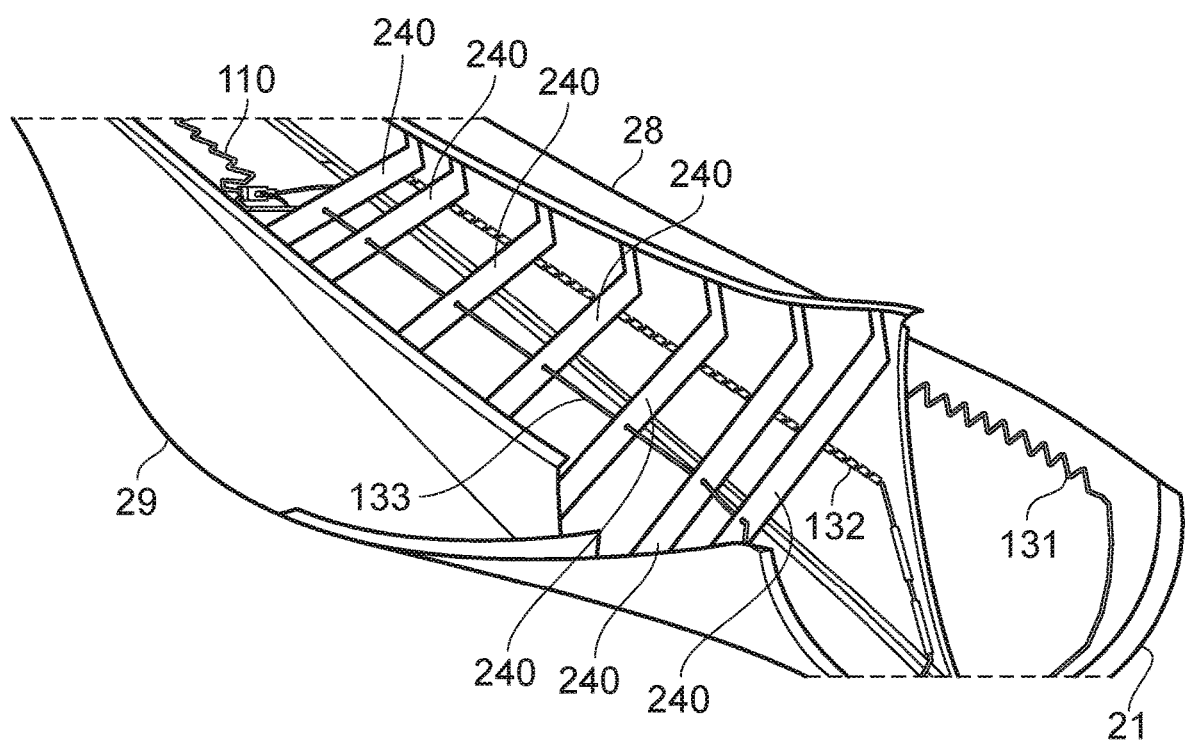
FIG. 16 shows a perspective view of a portion of a blade having the first, second and third examples.

As a skilled person will appreciate, various features of each of the above examples, and any or all of the described examples, may be combined. FIG. 16 shows an example having features of each of the three described examples above.

In FIG. 16, the down conductor 133 may be secured in free space within the blade shell by at least one floating conductor suspension strut. There may be provided at least one supporting component 240 in the form of at least one or a plurality of floating conductor suspension struts, which may support the down conductor 133. The down conductor 133 may be attached to the suspension struts, and/or pass through at least one aperture in a suspension strut. Each suspension strut may be provided with an aperture, dimensioned for the down conductor 133 to pass therethrough. The or each aperture may be provided centrally on the respective suspension strut. Each aperture may be aligned with at least one other aperture, or they may all be substantially aligned, so that the down conductor can be held in a substantially straight position. The or each suspension strut may be configured to bridge a plurality, for example two, shear webs. The or each suspension strut may be attached to at least two shear webs. The or each suspension strut may be substantially elongate, rectangular, and/or planar.

With reference to FIG. 16, each of the plurality of inboard down conductor cables 131, 132, 133 may each have insulation having different electrical breakdown voltages to one another. For example, the down conductor cable 131 provided at a leading edge 28 of the blade 20 may have a lower electrical breakdown voltage than at least one or each of the down conductor cables 132, 132 provided closer to the shear webs, and in turn closer to the electrically conductive components 31, 32 of the blade 20. At an outboard end of the blade portion shown in FIG. 16, there may be provided a down conductor 110, having a lower electrical breakdown voltage than a down conductor portion provided further inboard, thus benefiting from the advantages of the second example. Where one or more of the cables' electrical breakdown voltage is lower, a cost reduction and/or a mass reduction may be achieved.

The wind turbine blade 20 of the first example may include any or all features of the second example.

The cable second portion 232 of the second example may be at least partly comprised in one or more of the plurality of inboard down conductor cables 130 of the first example. The plurality of inboard down conductor cables 131, 132, 133 may have insulation having different electrical breakdown voltages to one another. At least one of the down conductor cables 131, 132, 133 may have insulation having the same electrical breakdown voltage as the cable first portion 231 insulation electrical breakdown voltage.

The down conductor cable portion 330 of the third example may be at least a portion of the down conductor cable 110, or any of the plurality of inboard down conductor cables 131, 132, 133 of the first example. The down conductor cable portion 330 of the third example may be any other down conductor cable of the wind turbine blade 20.

The down conductor cable portion 330 of the third example may be at least one of the plurality of inboard down conductor cables 131, 132, 133 of the first example.

At least one of the down conductor cables of any of the first, second, and third examples may be spaced apart from an electrically conductive portion of one or more of; a sensor system; a de-icing system; a lighting system; a load control system.

In the present disclosure, the term 'cable' also includes conductive bands, straps and braids.

Although the invention has been described above with reference to one or more preferred embodiments, it will be appreciated that various changes or modifications may be made without departing from the scope of the invention as defined in the appended claims.

Although a blade construction involving two spar caps and webs has been shown in some of the figures, the skilled person will appreciate that the examples may be implemented in other blade structures.

Although an example having three down conductor cables is described with respect to the first example, the plurality of inboard down conductor cables 131, 132, 133 may comprise only two down conductor cables, four, five, or any appropriate number.

Although an example having a converging electrical junction 140 to join one or more of a plurality of inboard down conductor cables 131, 132, 133 is described, as an alternative, at least two or all of the plurality of inboard down conductor cables may be directly or indirectly joined to a slip band at the root end 21 of the blade 20.

Although examples have been described where the electrically conductive component 31, 32 comprises spar cap, the electrically conductive component may be other conductive features in the blade, such as any system which has electrical wiring. The examples described above will protect these conductive features from lightning current.

The invention claimed is:

1. A wind turbine blade comprising:
a root end and a tip end, a spanwise dimension extending between the root and tip ends, and an inboard portion extending up to 50% of the spanwise dimension from the root end towards a midpoint between the root and tip ends;
at least one electrically conductive component disposed in the inboard portion;
at least two shear webs, each shear web of the at least two shear webs having a pair of discrete spar caps; and
a lightning protection system comprising:
a down conductor cable portion disposed inside the inboard portion of the blade; and
a supporting component,
wherein the down conductor cable portion is secured in free space by the supporting component in a position near or on a camber line of a blade aerofoil section of the wind turbine blade and spaced away from the at least one electrically conductive component, and
wherein the down conductor cable portion is secured in the free space between the at least two shear webs by the supporting component and spaced away from the at least two shear webs.

2. The wind turbine blade of claim 1, wherein the at least one electrically conductive component is a structural component comprising a spar cap, wherein the spar cap comprises carbon fibres, and wherein the carbon fibres are pultruded carbon fibres.

3. The wind turbine blade of claim 1, wherein the blade comprises two shell halves, each of the two shell halves having an electrically conductive component, and wherein the down conductor cable portion is spaced substantially equally from both electrically conductive components.

4. The wind turbine blade of claim 1, wherein the supporting component is one or more of: a foam piece; a foam sack; a bracket; and a straight beam.

5. The wind turbine blade of claim 4, wherein the supporting component is an X-shaped bracket.

6. The wind turbine blade of claim 4, wherein the supporting component is a C-shaped bracket.

7. The wind turbine blade of claim 4, wherein the supporting component is a Y-shaped bracket.

8. The wind turbine blade of claim 1, wherein the down conductor cable portion at least partly overlaps with the at least one electrically conductive component in the spanwise dimension.

9. The wind turbine blade of claim 1, wherein the lightning protection system further comprises:
a down conductor;
a diverging electrical junction disposed in the inboard portion; and
a plurality of inboard down conductor cables arranged electrically in parallel to one another and disposed in the inboard portion;
wherein the lightning protection system is configured so as to conduct electricity through the down conductor, through the diverging electrical junction, through the plurality of inboard down conductor cables, towards the root end of the blade.

10. The wind turbine blade of claim 1, wherein the lightning protection system further comprises:
a down conductor cable having the down conductor cable portion;
wherein the down conductor cable further comprises a cable first portion and a cable second portion, the cable first portion being closer to the root end of the blade than the cable second portion, each of the cable first portion and the cable second portion comprising insulation which has a respective electrical breakdown voltage, wherein the cable first portion insulation electrical breakdown voltage is higher than the cable second portion insulation electrical breakdown voltage.

11. The wind turbine blade of claim 10, wherein the down conductor cable portion comprises the cable first portion and/or the cable second portion.

12. The wind turbine blade of claim 1, wherein the down conductor cable portion is spaced apart from an electrically conductive portion of one or more of: a sensor system; a de-icing system, an anti-icing system; a lighting system; and a load control system.

13. The wind turbine blade of claim 1, wherein the inboard portion extends up to 40% of the spanwise dimension from the root end towards the tip end.

14. The wind turbine blade of claim 1, wherein the inboard portion extends up to 30% of the spanwise dimension from the root end towards the tip end.

15. The wind turbine blade of claim 1, wherein the down conductor cable portion is disposed substantially centrally between the at least two shear webs.

16. The wind turbine blade of claim 1, wherein the supporting component is attached to at least one of the at least two shear webs.

17. The wind turbine blade of claim 16, wherein the supporting component is attached to the at least one of the at least two shear webs at at least two locations.

18. The wind turbine blade of claim 16, wherein the supporting component is attached to more than one of the at least two shear webs.

19. The wind turbine blade of claim 18, wherein the down conductor cable portion is disposed substantially centrally between a pair of the at least two shear webs.

* * * * *